United States Patent [19]

Mainelli et al.

[11] Patent Number: 4,715,395

[45] Date of Patent: Dec. 29, 1987

[54] FLUID FLOW REGULATOR

[75] Inventors: Roy J. Mainelli, West Hartford, Conn.; Donald Preston, Agawam, Mass.

[73] Assignee: United Technologies Corporation, Hartford, Conn.

[21] Appl. No.: 880,601

[22] Filed: Jun. 30, 1986

[51] Int. Cl.4 .............................................. F15D 1/02
[52] U.S. Cl. ...................................... 138/42; 251/127
[58] Field of Search ........................... 138/42; 251/127

[56] References Cited

U.S. PATENT DOCUMENTS

| | | | |
|---|---|---|---|
| 1,915,867 | 6/1933 | Penick | 138/42 |
| 2,187,662 | 1/1940 | Pigott | 251/127 X |
| 2,200,788 | 5/1940 | Coy | 138/42 X |
| 2,664,109 | 12/1953 | Iagar | 138/42 |
| 3,545,492 | 12/1970 | Scheid | 138/42 |

OTHER PUBLICATIONS

*Lee Hydraulic Inserts*, Lee Company, 1984, pp. 1, 2, 3, 75-149.

*Primary Examiner*—Alan Cohan
*Attorney, Agent, or Firm*—Lloyd D. Doigan

[57] ABSTRACT

A plurality of angularly offset orifices (29) are disposed within a fuel line (13) to meter a flow of fuel therethrough. A first set (23) of orifices each have a length (L) (27) and a diameter (D) (31) having a first L/D ratio. A second set (35) of orifices each have a second L/D ratio.

4 Claims, 4 Drawing Figures

FLUID FLOW REGULATOR

TECHNICAL FIELD

This invention relates generally to a flow regulator and particularly to a flow regulator that maintains a relatively constant flow over a temperature range.

BACKGROUND ART

Modern aircraft may operate over a wide range of temperatures from Saharan heat to arctic cold, from high temperatures at low altitudes to subzero temperatures at high altitudes. Aircraft engines require a constant fuel flow at a given speed over those temperature ranges to ensure efficient, safe operation. For instance, for some applications, fuel flow should have no more than a ±2% weight flow deviation at a constant engine speed over a temperature range from −51° to 66° C. Variations in fuel flow, as effected by temperature, can cause a fuel/air mixture for an engine to be too lean or too rich. This improper fuel/air mixture can cause engine surging or flameout endangering the engine and the aircraft.

It is known in the art to provide a pack having a series of orifices within a fuel line to meter the fuel flow to an engine. Fuel pressure is controlled upstream and downstream of the pack and a pressure differential therebetween induces a desired amount of fuel to flow through the pack. Each orifice within the pack has a common length (L) and a common diameter (D), and is angularly offset from each adjacent orifice. This prior art pack provides a relatively constant weight flow over only a very narrow temperature range, which may not comport with the ambient conditions encountered by modern aircraft.

Accordingly what is needed in the art is an orifice pack that maintains a relatively constant fuel flow at a given engine speed and over a wide temperature range. Proper fuel flow to the engine over the temperature range ensures safe engine and aircraft operation.

DISCLOSURE OF INVENTION

Therefore, it is an object of the invention to provide a relatively constant fuel weight flow to an engine operating at a given speed over a wide temperature range.

This is and other objects of the invention are achieved by providing a series of orifices within a fuel line, the orifices having different discharge coefficients that accommodate changes in the specific gravity of fuel flowing through those orifices as the temperature of that fuel changes. By tailoring the length to diameter ratio (L/D) of each orifice, the discharge coefficient of each orifice is altered to provide the proper offset to the specific gravity of a chosen fuel.

In a preferred embodiment, two sets of orifices, each set having at least one orifice, are chosen. The orifices within a set have common L/D ratio though the orifices from set to set may have different L/D ratios. In an alternate embodiment, a single orifice is chosen with an L/D ratio having a discharge coefficient that accommodates changes in the specific gravity of a fuel flowing through the orifice as the temperature of that fuel changes.

BEST MODE FOR CARRYING OUT THE INVENTION

Figure 1:
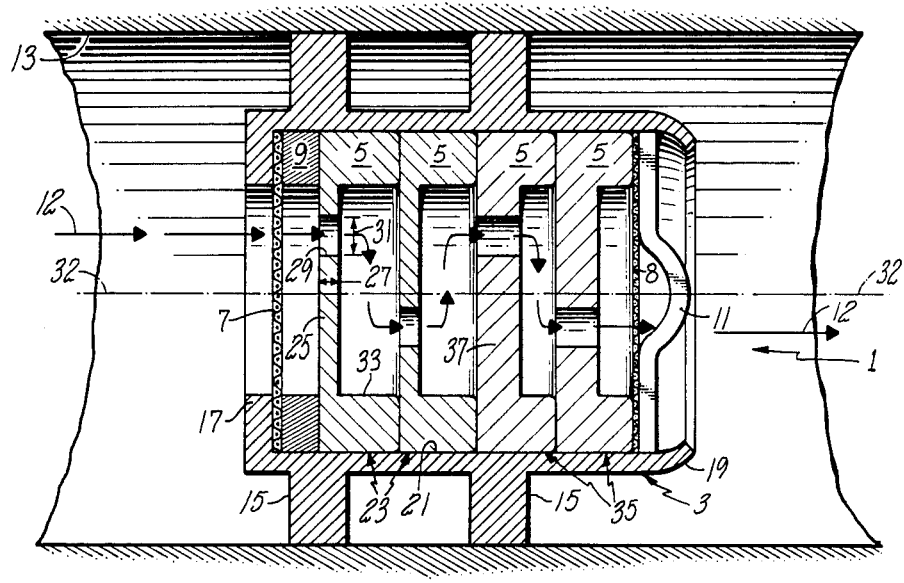
FIG. 1 is a sectional view of the orifice pack of this invention.

Referring to FIG. 1, the orifice pack 1 of this invention consists of a hollow, cylindrical orifice retainer 3, orifice cups 5, filters 7 and 8, a spacer 9, and a puller cap 11.

The retainer 3 is placed within a fuel line 13 to regulate a flow of fuel (arrow 12) to an engine. The retainer has two annular retaining flanges 15 extending outwardly therefrom, the flanges being sized for an interference fit within the line 13. The retainer has an annular shoulder 17 extending inwardly from the upstream end and a faired shoulder 19 tapering inwardly in a downstream direction at the downstream end, as will be discussed infra. The retainer has an interior diameter 21 sized to hold the orifice cups 5 tightly therewithin.

Figure 2:
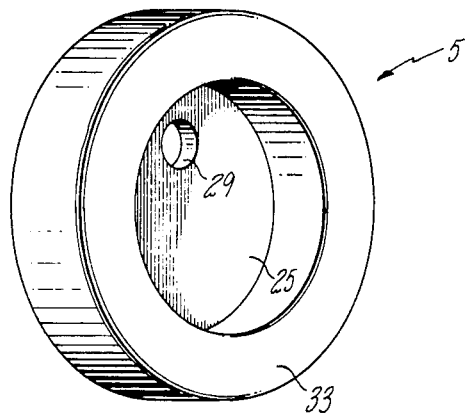
FIG. 2 is a perspective view of an orifice cup of this invention.

Each cup of a first set 23 of two orifice cups comprises: a circular plate 25 having a diameter closely approximating interior diameter 21 for fitting the cup within the retainer, an orifice 29 of a diameter (D) 31 and length (L) 27, the orifice arranged eccentrically and extending through the plate; and, an annular wall 33 extending longitudinally from plate 25 (see FIG. 2). The wall 33 of each cup serves to space each orifice from an adjacent next orifice in the set 23 to ensure that the discharge coefficient of each orifice is not disturbed by the proximity of fuel flowing through an adjacent orifice cup.

A second orifice cup of the first set of cups 23 having the same thickness plate 27 as a first orifice cup, abuts the first orifice cup. The second cup is angularly offset 180 degrees about an axial centerline 32 from the orientation of the first orifice cup to avoid having the flow of the first cup flow directly through the hole of the second cup, so that the coefficient of discharge of the orifice of the second orifice cup is unaffected by that flow.

A second set 35 of two orifice cups is arranged similarly to the first set of two orifice cups, as explained supra, with one exception; the length to diameter ratio (L/D) of the orifices of the second set of orifice cups differs from the L/D ratio of the first set of orifice cups.

Typically, the flow of fuel through an orifice pack is controlled by the equation:

$$W_f = K\, C_d\, D\, P\, S$$

where, $W_f$ = weight flow of a fuel;
K = a conversion constant;
$C_d$ = discharge coefficient of an orifice;
D = diameter of an orifice;
P = change in pressure through an orifice; and
S = specific gravity of the fuel.

Figure 3:
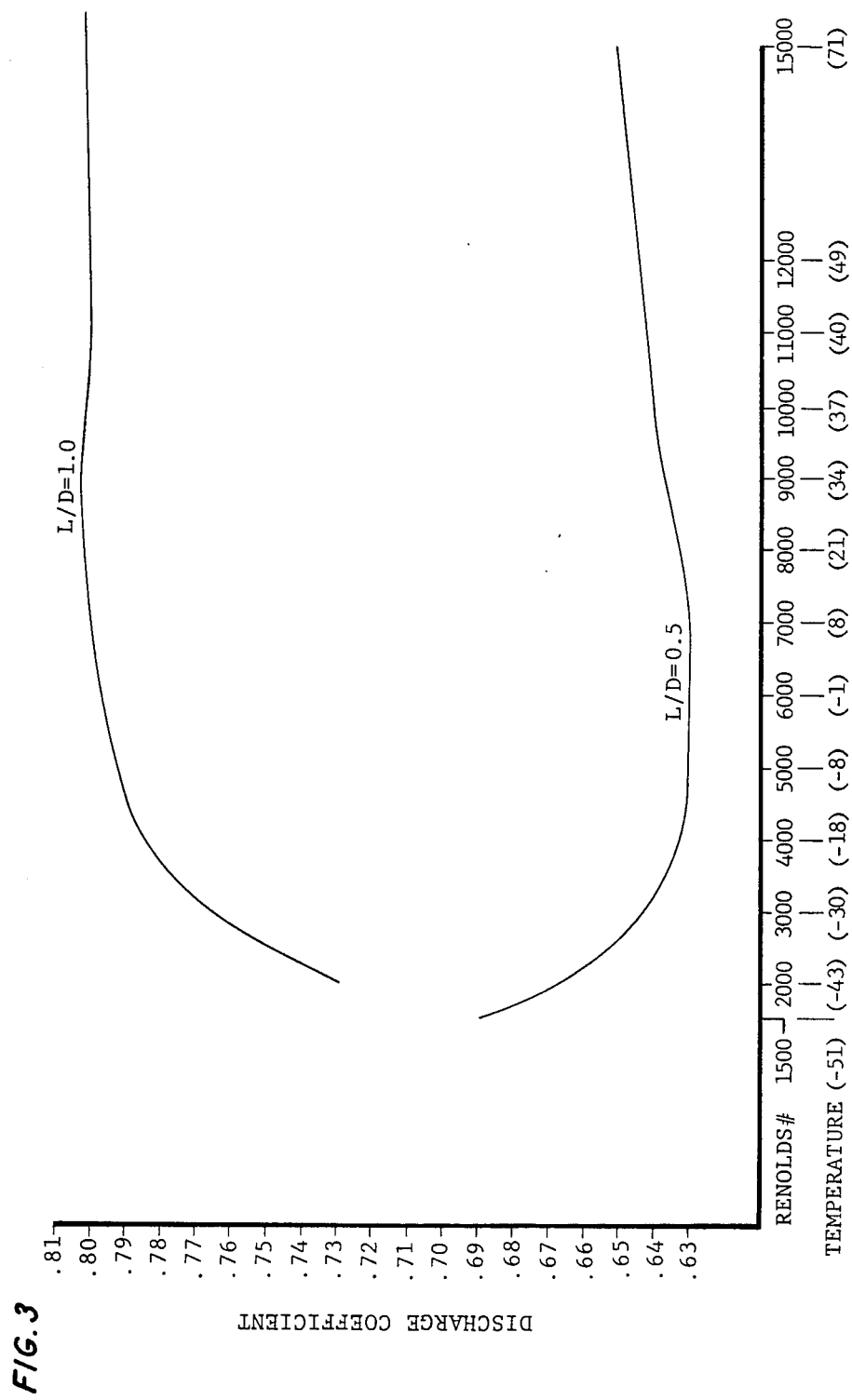
FIG. 3 is a graphical representation of the relation between discharge coefficient and temperature for different orifices.

The effect of temperature on the specific gravity (S) of a fuel is known and predictable. The specific gravity of a fuel varies linearly, but inversely to temperature, increasing as temperature decreases (increasing fuel flow) and decreasing as temperature increases (decreasing fuel flow). The discharge coefficient ($C_d$) also varies with temperature, since discharge coefficient varies with Reynolds Number and Reynolds Number varies with temperature. Discharge coefficients, however, generally vary nonlinearly to temperature, increasing with temperature increases in some temperature ranges and decreasing with temperature increases in other temperature ranges, affecting fuel flow accordingly. Since K, D and P are fixed relative to temperature, the temperature sensitive parameters of the equation ($C_d$ and S) in effect determine the weight flow of the fuel through the orifices as temperature changes. The discharge coefficient of an orifice can be controlled over a Reynolds number, and therefore over temperature, by varying the ratio of the diameter (D) of the orifice to the length (L) of the orifice (see FIG. 3 which shows changes in discharge coefficients for different L/D ratios over given temperature ranges). Ideally, an L/D ratio is chosen having a discharge coefficient that varies directly with temperature changes as a fuel's specific gravity varies inversely to temperature changes, resulting in a relatively constant weight flow ($W_f$) over a temperature range as the changes in specific gravity and discharge coefficient offset each other. Since orifices having the same discharge coefficient may not provide a desired offset to the specific gravity of a particular fuel over a wide temperature range, it has been found that by providing orifices with different discharge coefficients, the desired offset may be achieved. Therefore, the thickness of plate 37 of each cup within the second set is varied from the thickness of the first set of cups to differ the discharge coefficient of the second set of cups from the first set. Ideally, for a fuel such as Mil-F-7024A, the ratio between the thickness of the plate 25 (which is also the length of the orifice) and the diameter of the orifice 29 for the first set of orifice cups is 0.5. The ratio between the thickness of the plate 37 (the length of the orifice) and the diameter of the orifice 29 for the second set of orifice cups is 1.0.

Figure 4:
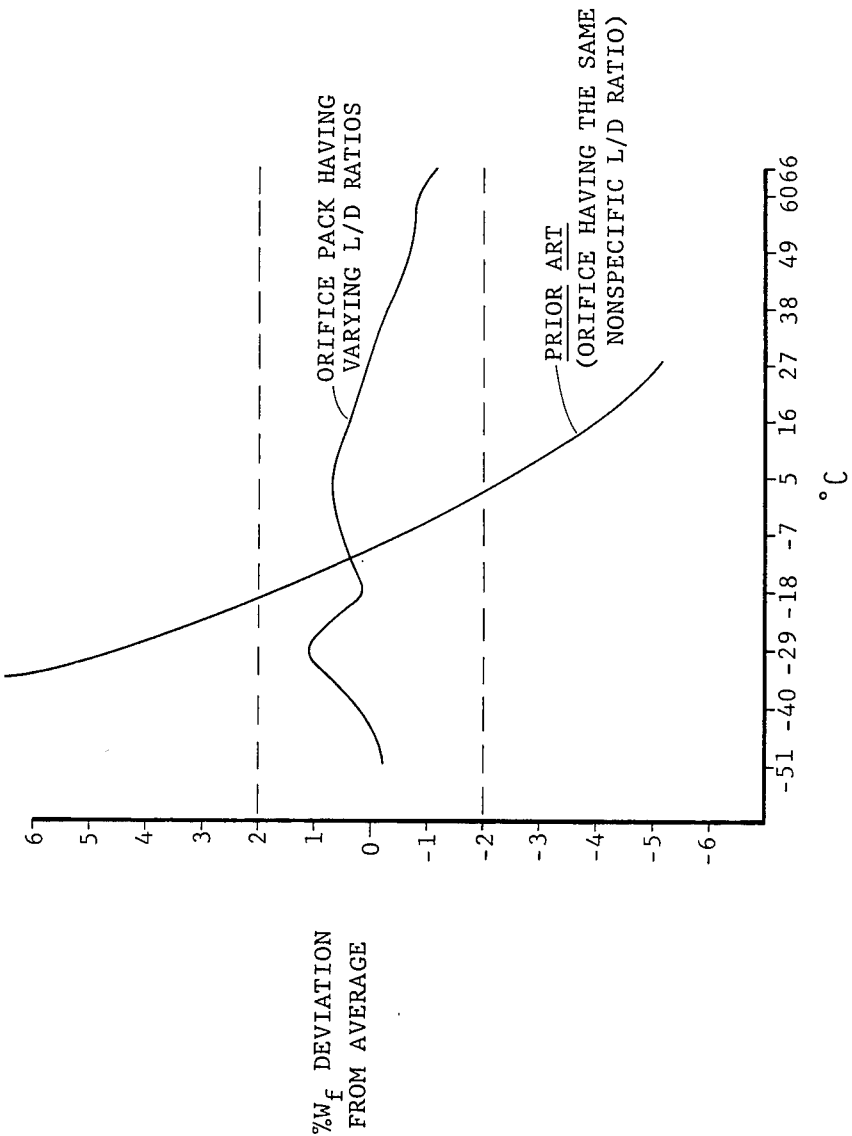
FIG. 4 is a graphical representation of weight flow over temperature for different orifice packs.

The relationship provides a weight flow deviation of less then ±2 percent over the temperature range from −51° to 66° C. for the orifice pack of this invention. FIG. 4 graphically shows the effects of using an orifice pack having properly chosen L/D ratios. The weight flow error of the invention over a wide temperature range is relatively low, far below ±2%. On the other hand, a prior art pack with a constant L/D ratio shows a large weight flow deviation for all but a very narrow temperature range (from about −18° to 5° C.). The orifice pack of this invention provides an accurate fuel flow throughout an aircraft's operating temperature range greatly reducing the probability of engine surging or flameout.

The orifice pack is constructed by inserting filter screen 7 against the shoulder 17 of the retainer 3. The screen helps remove particulates that may clog the orifices. A washer 9 spaces the retainer shoulder from the first set of orifice cups. The washer ensures that any turbulence caused by the filter occurs far enough away from the first cup to avoid disturbing the orifice discharge coefficient. The first set 23 of angularly offset orifice cups is then inserted into the retainer abutting the washer 9. The second set 35 of angularly offset orifice cups is inserted within the retainer abutting the first set 23 of orifice cups, the orifices in the second set of the orifice cups are angularly offset from the orifices in the first set of orifice cups to ensure a tortuous flow through all the orifice cups. A second filter screen 8 is inserted to abut the second set 35 of orifice cups to ensure that particulates that may foul the engine do not pass through the orifice pack. This entire assembly of filters, washer, and first and second set of cups is maintained within the orifice retainer by a puller cap 11 that is wedged within the orifice retainer by the tapered end portion 19 of the retainer.

Accordingly, what is provided is an orifice pack having orifices with varying length over diameter ratios to provide a relatively constant weight flow of fuel over a broad temperature range to help ensure safe engine and aircraft operation.

It should be understood that the invention is not limited to the particular embodiments shown and described herein, but that various changes and modifications may be made without departing from the spirit and scope of the invention as defined by the following claims. One of ordinary skill in the art would readily perceive that the orifice pack can be operated with the first and second sets of disk cups having only one cup each. However, one can appreciate that in order to maintain a desired flow through the orifice pack, the holes in each cup may have diameters that would be unreasonably small, and therefore, be subject to clogging.

We claim:

1. An apparatus for controlling a flow of a fluid through a series of spaced orifices, each orifice having a length (L), and a diameter (D) and over a temperature range characterized by:

said series having;

a first set of orifices, each of which having a first L/D ratio of approximately 0.5;

a second set of orifices, each of which having a second L/D ratio of approximately 1.0; and wherein said first and second sets of orifices each have an associated discharge coefficient wherein said apparatus maintains a relatively constant flow over a wide temperature range.

2. The apparatus of claim 1 wherein said series of orifices is further characterized by:

each orifice being angularly offset from an adjacent orifice to effect a tortuous flow through said series of orifices.

3. The apparatus of claim 2 wherein said first set and second sets of orifices each include characterized by two orifices.

4. An apparatus having a series of spaced orifices for controlling a flow of fluid therethrough each orifice having a length L and a diameter D, said fluid having a specific gravity S which varies linearly and inversely over a temperature range, said series of spaced orifices being characterized by:

a first set of orifices, each of said first set of orifices having a first L/D ratio and a first discharge coefficient corresponding to said first L/D ratio, said first discharge coefficient varying non-linearly over a temperature range;

a second set of orifices, each of said second set of orifices having a second L/D ratio and a second discharge coefficient corresponding to said second L/D ratio, said second discharge coefficient varying non-linearly over a temperature range, said first L/D ratio and said second L/D ratio being dimensioned such that the first discharge coefficient relating to said first L/D ratio and said second discharge coefficient relating to said second L/D ratio coefficient offset changes to said specific gravity of said fuel over a temperature range thereby providing for a relatively constant flow of fuel over said temperature range.

* * * * *